United States Patent
Andersson et al.

(10) Patent No.: US 10,517,113 B2
(45) Date of Patent: Dec. 24, 2019

(54) RADIO-NETWORK NODE, WIRELESS DEVICE AND METHODS PERFORMED THEREIN

(71) Applicant: Telefonaktiebolaget LM Ericsson (publ), Stockholm (SE)

(72) Inventors: Håkan Andersson, Linköping (SE); Andreas Bergström, Linköping (SE); Mattias Frenne, Uppsala (SE); Johan Furuskog, Stockholm (SE); Martin Hessler, Linköping (SE); Niclas Wiberg, Linköping (SE); Qiang Zhang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/153,188

(22) Filed: Oct. 5, 2018

(65) Prior Publication Data
US 2019/0075590 A1 Mar. 7, 2019

Related U.S. Application Data

(63) Continuation of application No. PCT/SE2017/050286, filed on Mar. 24, 2017.
(Continued)

(51) Int. Cl.
*H04L 12/26* (2006.01)
*H04W 72/14* (2009.01)
(Continued)

(52) U.S. Cl.
CPC ............ *H04W 72/14* (2013.01); *H04B 17/24* (2015.01); *H04L 1/1671* (2013.01);
(Continued)

(58) Field of Classification Search
CPC .......................... H04W 72/14; H04W 72/0413
See application file for complete search history.

(56) References Cited

U.S. PATENT DOCUMENTS

2007/0211656 A1* 9/2007 Kwak ................. H04B 7/204
2008/0232314 A1* 9/2008 Schneider ............ H04Q 7/00
(Continued)

FOREIGN PATENT DOCUMENTS

| EP | 3079272 A1 | 10/2016 |
|---|---|---|
| RU | 2012125265 A | 12/2013 |

(Continued)

OTHER PUBLICATIONS

Unknown, Author, "UCI multiplexing in the presence of UL data", 3GPP TSG-RAN WG1 #87, R1-1612239, Reno, USA, Nov. 14-18, 2016, 1-3.
(Continued)

*Primary Examiner* — Brandon M Renner (57) ABSTRACT

Embodiments herein relate to method performed by a radio-network node for handling a data transmission, from a wireless device to the radio-network node, in a wireless communication network. The radio-network node schedules one or more resources for carrying an uplink data transmission from the wireless device over a channel, and for carrying a feedback transmission, of a downlink data transmission from the radio-network node, over the same channel. The radio-network node transmits a control message to the wireless device, which control message indicates the one or more resources scheduled for carrying the uplink data transmission and the feedback transmission over the same channel.

12 Claims, 6 Drawing Sheets

Related U.S. Application Data (60) Provisional application No. 62/319,316, filed on Apr. 7, 2016.

(51) Int. Cl.
| | | |
|---|---|---|
| *H04W 72/12* | (2009.01) | |
| *H04B 17/24* | (2015.01) | |
| *H04L 1/18* | (2006.01) | |
| *H04W 72/04* | (2009.01) | |
| *H04L 1/16* | (2006.01) | |

(52) U.S. Cl.
CPC .......... *H04L 1/1854* (2013.01); *H04L 1/1858* (2013.01); *H04W 72/0413* (2013.01); *H04W 72/1268* (2013.01); *H04W 72/1289* (2013.01)

(56) References Cited

U.S. PATENT DOCUMENTS

| | | | |
|---|---|---|---|
| 2010/0103044 A1* | 4/2010 | Hoshino | H01Q 3/00 |
| 2010/0135181 A1* | 6/2010 | Earnshaw | H04L 12/26 |
| 2011/0092240 A1 | 4/2011 | Aiba et al. | |
| 2013/0010745 A1* | 1/2013 | Ko | H04W 72/04 |
| 2013/0039272 A1* | 2/2013 | Chen | H04W 4/00 |
| 2013/0039321 A1 | 2/2013 | Kim et al. | |
| 2013/0223295 A1* | 8/2013 | Choi | H04W 72/0406 |
| 2013/0229998 A1* | 9/2013 | Noh | H04W 72/04 |
| 2015/0189625 A1* | 7/2015 | Shen | H04L 27/2679 370/329 |
| 2016/0043848 A1* | 2/2016 | Kim | H04L 5/0051 370/280 |
| 2016/0112169 A1* | 4/2016 | Yerramalli | H04L 1/1822 370/252 |
| 2016/0262182 A1* | 9/2016 | Yang | H04W 4/70 |
| 2016/0381674 A1* | 12/2016 | Kim | H04W 72/0413 |
| 2017/0346606 A1* | 11/2017 | Li | H04L 1/1812 |

FOREIGN PATENT DOCUMENTS

| | | |
|---|---|---|
| WO | 2011/063244 A1 | 5/2011 |
| WO | 2015/084048 A1 | 6/2015 |

OTHER PUBLICATIONS

Unknown, Author, "UCI transmission on PUSCH for eCA", 3GPP TSG RAN WG1 Meeting #82bis, R1-155227, Malmö, Sweden, Oct. 5-9, 2015, 1-3.

Unknown, Author, "UL ACK/NAK and CQI feedback in Carrier Aggregation", 3GPP TSG RAN WG1 meeting #58-bis, R1-094037, Miyazaki, Japan, Oct. 12-16, 2009, 1-4.

* cited by examiner

RADIO-NETWORK NODE, WIRELESS DEVICE AND METHODS PERFORMED THEREIN

RELATED APPLICATIONS

This application is a continuation of and claims the benefit of and priority to PCT/SE2017/050286 having an effective filing date of 24 Mar. 2017, which claims the benefit of and priority to U.S. Provisional Patent Application Ser. No. 62/319,316, filed 7 Apr. 2016. The entire contents of the aforementioned applications are incorporated herein by reference.

TECHNICAL FIELD

Embodiments herein relate to a radio-network node, a wireless device and methods performed therein for wireless communication. Furthermore, a computer program and a computer-readable storage medium are also provided herein. In particular, embodiments herein relate to handling communication of data, such as data transmission to the radio-network node, in a wireless communication network.

BACKGROUND

In a typical wireless communication network, wireless devices, also known as wireless communication devices, mobile stations, stations (STA) and/or user equipments (UE), communicate via a Radio Access Network (RAN) with one or more core networks (CN). The RAN covers a geographical area which is divided into service areas or cell areas, which may also be referred to as a beam or a beam group, with each service area or cell area being served by a radio-network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio-network node. The radio-network node communicates over an air interface operating on radio frequencies with a wireless device within range of the radio-network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, a plurality of radio-network nodes may be connected, e.g., by landlines or microwave, to a controller node, such as a radio-network controller (RNC) or a base station controller (BSC), which supervises and coordinates various activities of the plurality of radio-network nodes connected thereto. This type of connection is sometimes referred to as a backhaul connection. The RNCs and BSCs are typically connected to one or more core networks.

Specifications for Evolved Packet System (EPS), also called a Fourth Generation (4G) network, have been completed within 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio-network nodes are directly connected to the EPC core network rather than to RNCs. In general, in E-UTRAN/LTE the functions of an RNC are distributed between the radio-network nodes, e.g. eNodas in LTE, and the core network. As such, the RAN of an EPS has an essentially "flat" architecture comprising radio-network nodes connected directly to one or more core networks, i.e. they are not connected to RNCs. To compensate for that, the E-UTRAN specification defines a direct interface between the radio-network nodes, this interface being denoted the X2 interface. EPS is the Evolved 3GPP Packet Switched Domain.

Advanced Antenna Systems (AASs) is an area where technology has advanced significantly in recent years and where a rapid technology development in the years to come is foreseen. Hence it is natural to assume that AASs in general and massive Multiple Input Multiple Output (MING) transmission and reception in particular will be a cornerstone in a future Fifth Generation (5G) system.

In relation to AAS, beam-forming is becoming increasingly popular and capable and it is not only for transmission of data but also for transmission of control information. This is one motivation behind a control channel in LTE known as Enhanced Physical Downlink Control Channel (ePDCCH). When the control channel is beam-formed, the cost of transmitting the overhead control information can be reduced due to the increased link budget provided by the additional antenna gain.

Automatic repeat-request (ARQ) is an error-control technique used in many wireless networks. With ARQ, a receiver of data transmissions sends acknowledgements (ACKs) or negative acknowledgments (NACKs) to inform the transmitter of whether each message has been correctly received. Incorrectly received messages, as well as messages that aren't acknowledged at all, can then be re-transmitted.

Hybrid ARQ (HARQ) combines ARQ with forward error-correction (FEC) coding of the data messages, to improve the ability of the receiver to receive and correctly decode the transmitted messages. As with conventional ARQ, receivers employing HARQ send ACKs and NACKs, as appropriate, after each attempt to decode a message. These ACKs and NACKs are referred to as "HARQ feedback".

For downlink HARQ transmissions in LTE today, HARQ feedback is sent from the wireless device, e.g. a User Equipment (UE) to the Network (NW) on either Physical Uplink Control Channel (PUCCH) or Physical Uplink Shared Channel (PUSCH), depending on whether the wireless device has been scheduled for an uplink PUSCH transmission or not. The NW can thereafter, on an individual HARQ process basis, draw conclusions on whether the last HARQ reception for that process was successful or not, based on received ACK or NACK, or even if the Downlink (DL) Assignment reception failed, i.e. the wireless device does not send any feedback also called Discontinuous Transmission (DTX).

The timing of the transmitted HARQ feedback in LTE is such that, for Frequency Division Duplexing (FDD), the feedback from one HARQ Receive (RX) process is received in the Uplink (UL) in subframe n+4 if the corresponding DL data transmission for that process was in subframe n, corresponding to 4 milliseconds (ms) in total. For Time Division Duplexing (TDD), the delay frog DL data transmission to UL feedback reception may be larger than four to cater for the half-duplex DL-UL split.

Providing feedback as in prior art may limit the performance of the wireless communication network.

SUMMARY

An object herein provide a mechanism that enhances performance of the wireless communication network.

According to embodiments herein, the object is achieved by providing a method performed by a radio-network node for handling a data transmission, from a wireless device to the radio-network node, in a wireless communication network. The radio-network node schedules one or more resources for carrying an uplink data transmission from the wireless device over a channel, and for carrying a feedback transmission, of a downlink data transmission from the radio-network node, over the same channel. The radio-network node further transmits a control message to the wireless device, which control message indicates the one or more resources scheduled for carrying the uplink data transmission and the feedback transmission over the same channel.

According to embodiments herein, the object is also achieved by providing a method performed by a wireless device for handling a data transmission to a radio-network node in a wireless communication network. The wireless device receives, from the radio-network node, a control message, which control message indicates one or more resources scheduled for carrying an uplink data transmission over a channel and a feedback transmission over the same channel. The feedback transmission is for a downlink data transmission from the radio-network node. The wireless device performs the uplink data transmission and the feedback transmission to the radio-network node over the same channel using the one or more resources indicated in the control message.

According to embodiments herein, the object is additionally achieved by providing a radio-network node for handling a data transmission, from a wireless device to the radio-network node, in a wireless communication network. The radio-network node is configured to schedule one or more resources for carrying an uplink data transmission from the wireless device over a channel, and for carrying a feedback transmission, of a downlink data transmission from the radio-network node, over the same channel. The radio-network node is further configured to transmit a control message to the wireless device, which control message indicates the one or more resources scheduled for carrying the uplink data transmission and the feedback transmission over the same channel.

According to embodiments herein, the object is additionally achieved by providing a wireless device for handling a data transmission to a radio-network node in a wireless communication network. The wireless device is configured to receive, from the radio-network node, a control message, which control message indicates one or more resources scheduled for carrying an uplink data transmission over a channel and a feedback transmission over the same channel, which feedback transmission is for a downlink data transmission from the radio-network node. The wireless device is further configured to perform the uplink data transmission and the feedback transmission to the radio-network node over the same channel using the one or more resources indicated in the control message.

It is furthermore provided herein, a computer program comprising instructions, which, when executed on at least one processor, cause the at least one processor to carry out any of the methods above, as performed by the radio-network node or the wireless device. It is additionally provided herein a computer-readable storage medium, having stored thereon a computer program comprising instructions which, when executed on at least one processor, cause the at least one processor to carry out the method according to any of the methods above, as performed by the radio-network node or the wireless device.

Embodiments herein provide a manner of enabling feedback of the DL data transmission to the radio-network node in an efficient manner. By scheduling the UL data transmission and the feedback transmission in a same control message, e.g., control information or control part of a message such as same UL grant, the feedback is provided back to the radio-network node in a t manner leading to an improved performance of the wireless communication network. Embodiments herein introduce no bit errors to the channel, such as PUSCH, by the feedback transmission since there is no puncturing. Problems with missed grants that could cause a multiplexing scheme to fail are also avoided since both the UL data transmission and the feedback transmission are scheduled in the same control message.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

Embodiments of the invention are now described, by way of example, with reference to the accompanying drawings, in which.

DETAILED DESCRIPTION

Figure 1:
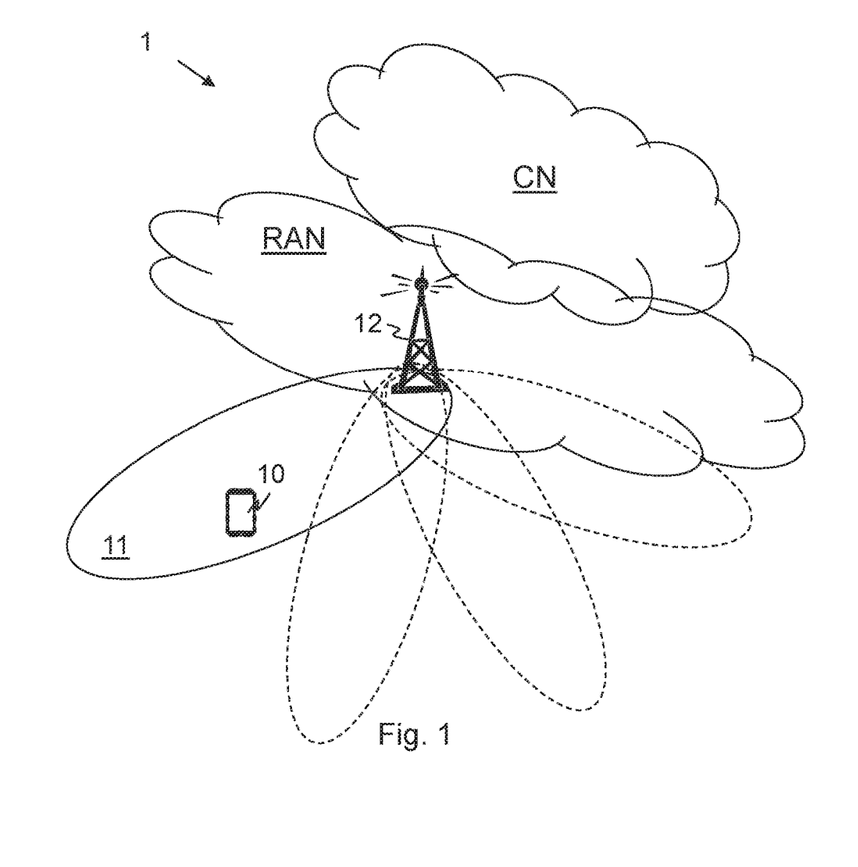
FIG. 1 is an overview depicting a wireless communication network, according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Wi-Fi, LTE, LTE-Advanced, New Radio (NR), 5G, WCDMA, GSM/enhanced Data rate for GSM Evolution (EDGE), Worldwide Interoperability for Microwave Access (Wi-Max), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminals, may communicate via one or more Access Networks (AN), e.g. RAN, with one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 1 comprises a radio-network node 12 providing radio coverage over a geographical area, a service area 11, which may also be referred to as a beam or a beam group, of a first radio access technology (RAT), such as NR, 5G, LTE, Wi-Fi or similar. The radio-network node 12 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote nit, an Access Point Base Station, a base station router, a transmission arrangement of a radio base station, a stand-alone access point or any other network unit capable of communicating with a wireless device within the service area served by the radio-network node 12 depending e.g. on the first radio access technology and terminology used. The radio-network node 12 may be referred to as a serving radio-network node and communicates with the wireless device 10 with Downlink (DL) transmissions to the wireless device 10 and Uplink (UL) transmissions from the wireless device 10.

As part of developing embodiments herein a problem has been identified. In e.g. LTE, UL scheduling and DL feedback information, such as DL HARQ messages, transmitted in UL are decoupled. This means that previously the UL scheduling is handled via an UL grant from the radio-network node 12 while the scheduling of the DL HARQ is governed by a fixed timing that mandates it to be transmitted 4 subframes after a corresponding DL data transmission has been received.

HARQ transmissions may take place over the PUCCH if no PUSCH transmission is scheduled. However, if PUSCH is scheduled, the HARQ transmission is instead moved to the PUSCH where it is punctured "on top of" UL data such as PUSCH data. The puncturing destroys some of the PUSCH transmission bits, but it is likely that the PUSCH transmission bits may still be recovered through error-correcting mechanisms.

The reason for using puncturing rather than multiplexing is that it avoids the problem of the wireless device 10 misses receiving a grant for the UL data transmission or misses receiving a Downlink Control information (DCI) for the DL data transmission. If one or the other is missed i.e. not received or not decoded correctly, the decoding at the radio-network node would fail if the information was multiplexed since the wireless device and the radio-network node would be in disagreement as to what was actually contained in the transmission.

According to embodiments herein the wireless device 10 may comprise data for transmission to the radio-network node 12. The radio-network node 12 schedules one or more resources for the wireless device 10 for carrying the transmission of an UL data transmission from the wireless device 10, and for carrying feedback transmission, of a DL data transmission from the radio-network node 12, from the wireless device 10. Information regarding the scheduling is then transmitted to the wireless device 10.

The wireless device 10 provides the UL data transmission and feedback information, e.g. HARQ feedback, of the DL data transmission, data over e.g. a PDSCH, from the radio-network node 12. The feedback information may be transmitted as part of the Uplink Control Information (UCI) on PUSCH as scheduled by the radio-network node 12. E.g. the UL data and the feedback information may be multiplexed e.g. into the PUSCH and transmitted to the radio-network node 12.

Thus, embodiments herein provide a mechanism that efficiently sets up the configuration of the feedback information when providing scheduling information for UL data transmission from the wireless device 10. Embodiments herein introduce no bit errors to e.g. the PUSCH by the HARQ transmission since there is no puncturing, and there is no problem with missed grants that could cause a multiplexing scheme to fail since both UL data and feedback information are scheduled in the same UL grant or same control message.

Figure 2:
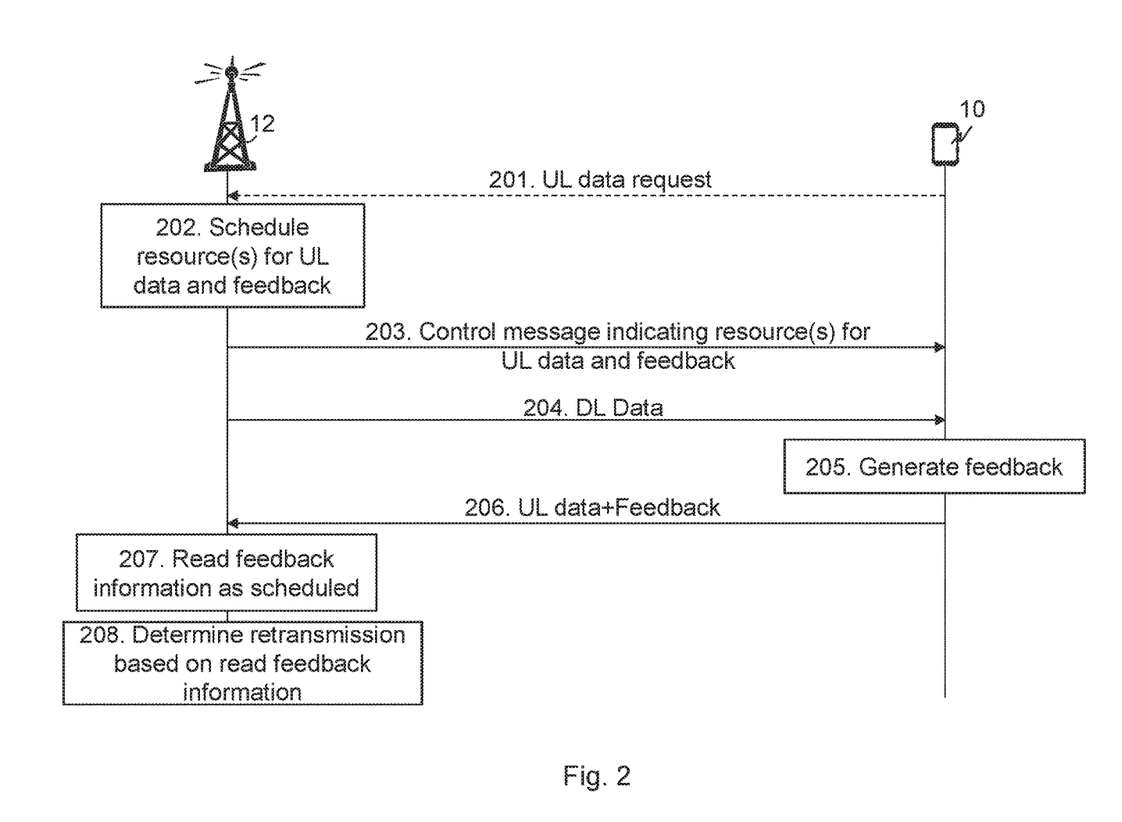
FIG. 2 is a combined flowchart and signaling scheme, according to embodiments herein.

FIG. 2 is a combined flowchart and signaling scheme according to embodiments herein. Actions may be performed in any suitable order.

Action 201. The wireless device 10 has data intended for the radio-network node 12 or for transmission to another node or wireless device. The wireless device 10 may then transmit an UL data request, marked with a dashed arrow, when data are buffered for transmission at the wireless device 10. The wireless device 10 may alternatively or additionally receive a request from the radio-network node 12 requesting the UL data transmission from the wireless device 10.

Action 202. The radio-network node 12 schedules one or more resources, such as subframes, resource elements, resource blocks, symbols of frequencies, for carrying the UL data transmission over a channel such as PUSCH from the wireless device 10. Furthermore, the radio-network node 12 schedules one or more resources for carrying, from the wireless device 10, the feedback transmission of a DL data transmission from the radio-network node 12.

Action 203. The radio-network node 12 then transmits the control message or information, such as an UL grant, indicating the scheduling of the one or more resources for carrying the UL data transmission over the channel from the wireless device 10. The same control message further indicates the scheduling of the one or more resources for the feedback transmission of the DL data transmission from the radio-network node 12. The UL data transmission and feedback transmission is carried over the same channel such as the PUSCH. Thus, embodiments herein disclose the transmission of the scheduling of the feedback such as UCI and UL, data in one UL grant. Feedback indicators of the feedback information may comprise one bit to indicate that the ACK/NACK is present and where, which resource elements, it is present may be given by standard.

In some embodiments, the feedback indicators such as ACK/NACK, when present, are mapped to resources such as resource elements closest to demodulation reference signals so that the quality of the channel estimates is best for ACK/NACK, which is more important than other types of UCI, e.g. Channel Quality Indicator (CQI) and Rank Indicator (RI). The data is then rate matched, i.e. mapped around these resource elements, to avoid the resource elements used for the feedback indicators.

In some embodiments, a scheduling command in the control message, for inclusion of ACK or NACK, is more than one bit, and allows not only indicating presence of the feedback indicatory but additionally placing the feedback indicators in a subband of a whole scheduled frequency band. So the feedback information or indicators do not have the same transmission bandwidth as the UL data transmission. By doing this, a scheduler in the radio-network node 12 can place resources for the feedback transmission in the subband out of several possible subbands, for which the channel fading in frequency domain is favourable, a so-called fading peak. The benefit is better reception and more robustness of the feedback information.

Thus, embodiments herein may enable a PUSCH transmission that may be rate-matched to available resources, meaning that the coding rate, i.e., the amount of redundancy added, is adapted to suit the expected channel conditions, e.g. Signal to Interference plus Noise Ratio (SINK), and number of bits available for the transmission to yield a target error probability.

Action 204. The radio-network node 12 may transmit DL data a DL data transmission to the wireless device 10.

Action 205. The wireless device 10 attempts to decode the received DL data and generates feedback information regarding the decoding e.g. ACK in case of successful decoding, NACK in case of unsuccessful decoding of data and Discontinuous transmission (DTX), i.e. no transmission, in case of unsuccessful decoding of control information i.e. not detecting a DL grant for the DL data transmission.

Action 206. The wireless device 10 then transmits UL data and generated feedback information as scheduled in the control message over the same channel, e.g. the PUSCH.

Action 207. The radio-network node 12 may read the feedback information based on knowledge of the scheduled one or more resources for the feedback. The radio-network node 12 further also reads the UL data transmission.

Action 208. The radio-network node determines whether to retransmit any DL data based on the read feedback.

Figure 3:
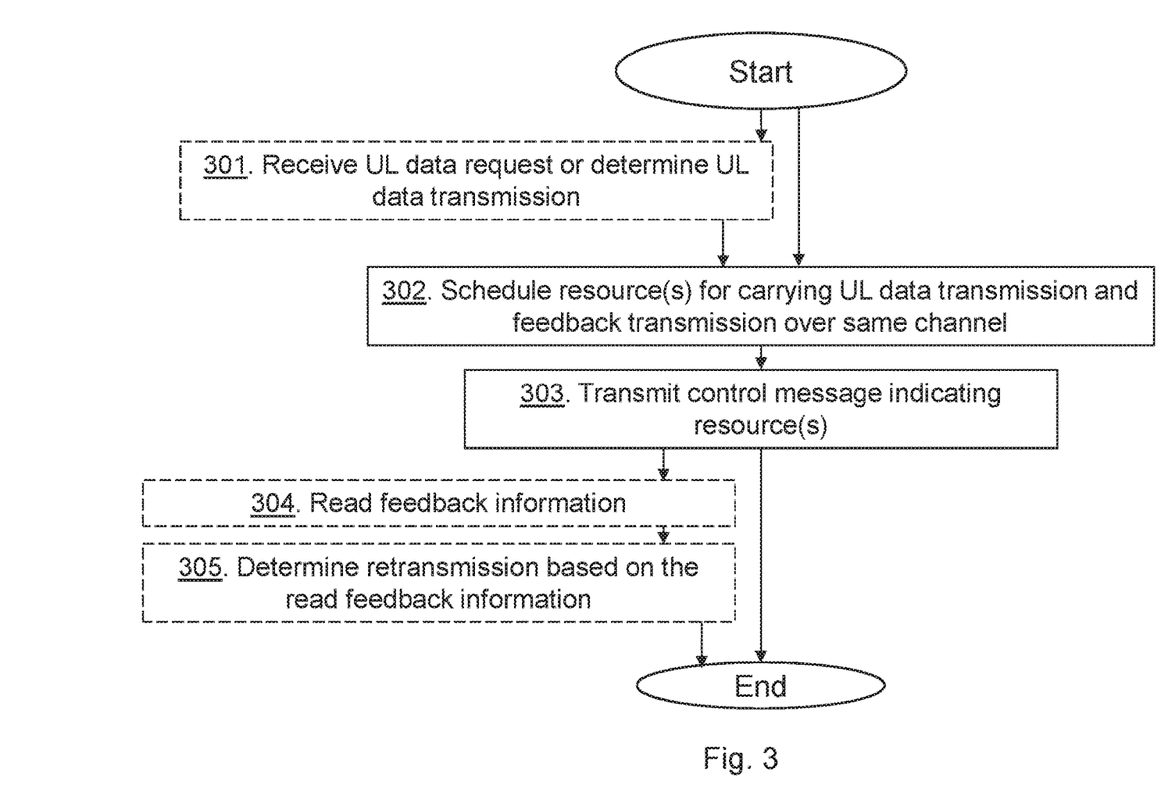
FIG. 3 is a schematic flowchart depicting a method performed by a radio-network node, according to embodiments herein.

FIG. 3 is a flowchart depicting a method performed by the radio-network node 12 for handling a data transmission, such as transmission of data over a subframe, from the wireless device 10 to the radio-network node 12 in the wireless communication network 1. Actions may be performed in any suitable order and optional actions are marked as dashed boxes.

Action 301. The radio-network node 12 may receive the UL data request from the wireless device 10 or UL data may be requested from the radio-network node 12, e.g. requesting measurement data from the wireless device or similar.

Action 302. The radio-network node 12 schedules one or more resources for carrying the uplink data transmission from the wireless device 10 over the channel, such as the PUSCH, and for carrying the feedback transmission, of the downlink data transmission from the radio-network node 12, over the same channel.

Action 303. The radio-network node 12 transmits the control message to the wireless device 10. The control message indicates the one or more resources scheduled for carrying the uplink data transmission and the feedback transmission over the same channel. Hence, the control message indicates the scheduling of resources for carrying the data transmission over channel from the wireless device 10, and the control message further indicates the scheduling of resources for feedback transmission of the data transmission, DL data, from the radio-network node 12 over the same channel. The control message may be an uplink grant.

Action 304. The radio-network node 12 may then read the feedback information received over the channel as scheduled.

Action 305. The radio-network node 12 may then determine based on the read feedback information whether to retransmit DL data of the downlink data transmission or not.

Figure 4:
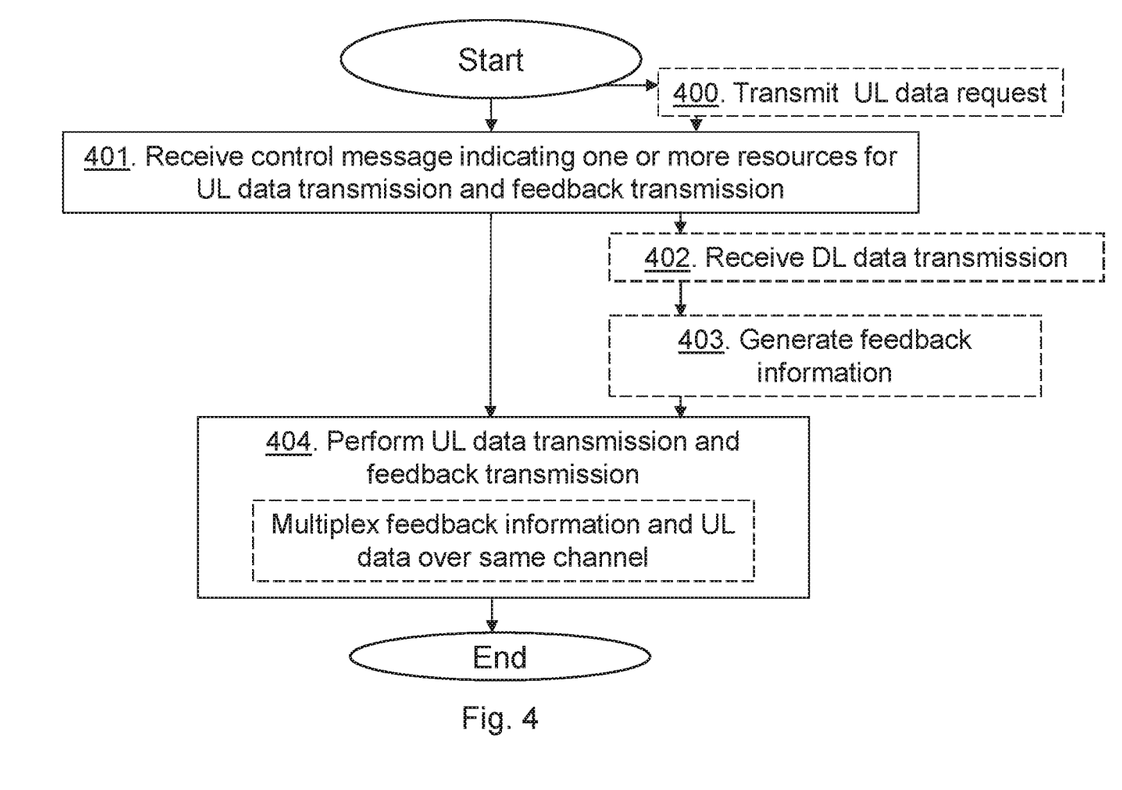
FIG. 4 is a schematic flowchart depicting a method performed by a wireless device, according to embodiments herein.

FIG. 4 is a flowchart depicting a method performed by the wireless device 10 for handling the data transmission, UL data, to the radio-network node 12 in the wireless communication network 1. Actions may be performed in any suitable order and optional actions are marked as dashed boxes.

Action 400. The wireless device 10 may have data intended for the radio-network node 12 or for transmission to another node or wireless device. The wireless device 10 may then transmit the UL date request, e.g. an UL Scheduling Request (SR), to the radio-network node 12 indicating UL data transmission from the wireless device 10. The UL data transmission may also be requested from the radio-network node 12.

Action 401. The wireless device 10 receives from the radio-network node 12, the control message, which control message indicates the one or more resources scheduled for carrying the uplink data transmission the channel and the feedback transmission over the same channel, which feedback transmission is for the downlink data transmission from the radio-network node 12. The control message may be an UL grant, and the control message may indicate the scheduling of resources for carrying the data transmission over the channel from the wireless device 10. Furthermore, the control message may further indicate the scheduling of resources for feedback transmission, over the channel, of one or more data transmissions from the radio-network node 12.

Action 402. The wireless device 10 may receive the DL data transmission from the radio-network node 12, e.g. a number of subframes carrying data information and control information/parts.

Action 403. The wireless device 10 may generate feedback information of the received data transmission for the feedback transmission e.g. add feedback indicators into a feedback message.

Action 404. The wireless device 10 performs the uplink data transmission and the feedback transmission to the radio-network node 12 over the same channel using the one or more resources indicated in the control message. Thus, the wireless device 10 transmits the UL data to the radio-network node 12 as scheduled and also the feedback, e.g. feedback indicator, of the DL data transmission as scheduled in the control message to the radio-network node 12. The wireless device 10 may perform the uplink data transmission and the feedback transmission to the radio-network node 12 by multiplexing the feedback information with uplink data of the uplink data transmission over the same channel e.g. multiplexing feedback indicators/information, with UL data over the channel such as a shared channel e.g. the PUSCH.

Figure 5:
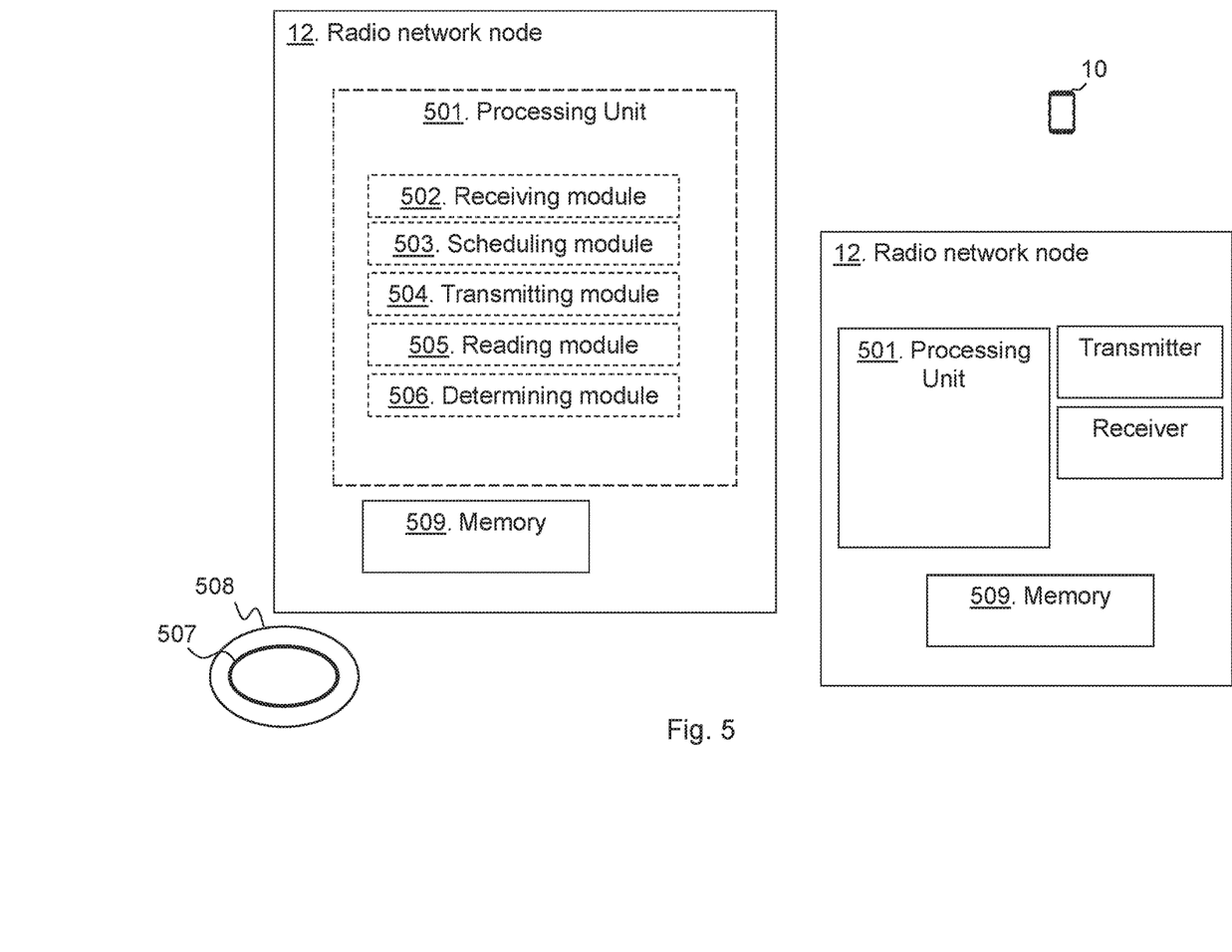
FIG. 5 is a block diagram depicting a radio-network node, according to embodiments herein.

FIG. 5 is a block diagram depicting the radio-network node 12, in two embodiments, for handling a data transmission, such as an UL data transmission of data over a subframe, from the wireless device 10 to the radio-network node 12 in the wireless communication network 1.

The radio-network node 12 may comprise a processing unit 501, e.g. one or more processors, configured to perform the methods herein.

The radio-network node 12 may comprise a receiving module 502, e.g. a receiver or transceiver. The radio-network node 12, the processing unit 501, and/or the receiving module 502 may be configured to receive the UL scheduling request from the wireless device 10.

The radio-network node 12 may comprise a scheduling module 503, e.g. a scheduler. The radio-network node 12, the processing unit 501, and/or the scheduling module 503 is configured to schedule one or more resources for carrying the uplink data transmission from the wireless device 10 over the channel, and for carrying the feedback transmission, of the downlink data transmission from the radio-network node, over the same channel.

The radio-network node 12 may comprise a transmitting module 504, e.g. a transmitter or transceiver. The radio-network node 12, the processing unit 501, and/or the transmitting module 504 is configured to transmit the control message to the wireless device 10, which control message indicates the one or more resources scheduled for carrying the uplink data transmission and the feedback transmission over the same channel. The control message may be an uplink grant and the channel may be the PUSCH.

The radio-network node 12 may comprise a reading module 505. The radio-network node 12, the processing unit 501, and/or the reading module 505 may be configured to read the feedback information received over the channel as scheduled.

The radio-network node 12 may comprise a determining module 506. The radio-network node 12, the processing unit 501, and/or the determining module 506 may be configured to determine, based on the read feedback information, whether to retransmit downlink data of the downlink data transmission or not.

The methods according to the embodiments described herein for the radio-network node 12 are respectively implemented by means of e.g. a computer program 507 or a computer program product, comprising instructions, i.e., software code portions, which, when executed on at least one processor, cause the at least one processor to carry out the actions described herein, as performed by the radio-network node 12. The computer program 507 may be stored on a computer-readable storage medium 508, e.g. a disc, a USB or similar. The computer-readable storage medium 508, having stored thereon the computer program, may comprise the instructions which, when executed on at least one processor, cause the at least one processor to carry out the actions described herein, as performed by the radio-network node 12. In some embodiments, the computer-readable storage medium may be a non-transitory computer-readable storage medium.

The radio-network node 12 further comprises a memory 509. The memory comprises one or more units to be used to store data on, such as feedback indicators, resources, SRs, DL data, UL Grants, applications to perform the methods disclosed herein when being executed, and similar. Thus, the first radio-network node 12 for handling the data transmission, from the wireless device 10 to the radio-network node 12, in the wireless communication network 1 may herein be provided wherein the memory 509 contains instructions executable by said processing unit 501 whereby the first radio-network node 12 is operative to perform the methods herein.

Figure 6:
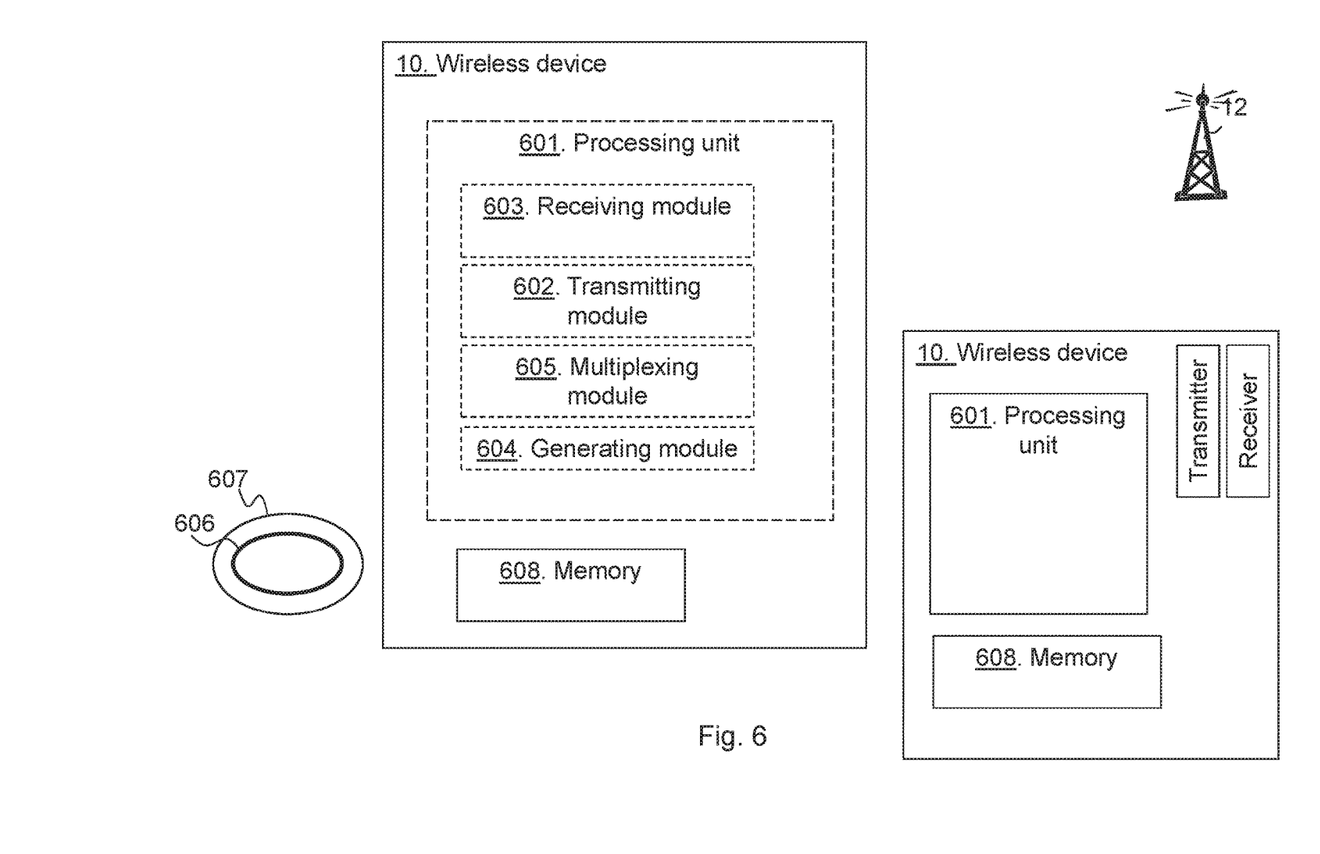
FIG. 6 is a block diagram depicting a wireless device, according to embodiments herein.

FIG. 6 is a block diagram depicting the wireless device 10, in two embodiments, for handling the data transmission, UL data, to the radio-network node 12 in the wireless communication network 1.

The wireless device 10 may comprise a processing unit 601, e.g. one or more processors, configured to perform the methods herein.

The wireless device 10 may comprise a transmitting module 602 e.g. a transmitter or transceiver. The wireless device 10, the processing unit 601, and/or the transmitting module 602 may be configured to transmit, when the wireless device 10 has data intended for the radio-network node 12 or for transmission to another node or wireless device, the UL data request, e.g. an SR, to the radio-network node 12 indicating UL data transmission from the wireless device 10.

The wireless device 10 may comprise a receiving module 603, e.g. a receiver or transceiver. The wireless device 10, the processing unit 601, and/or the receiving module 603 is configured to receive the control message, from the radio-network node 12, which control message indicates the one or more resources scheduled for carrying the uplink data transmission over the channel and the feedback transmission over the same channel. The feedback transmission is for the downlink data transmission from the radio-network node 12. The control message may indicate scheduling of resources for carrying the data transmission over the channel from the wireless device 10. Furthermore, the control message may indicate the scheduling of resources for feedback transmission, over the channel, of one or more data transmissions from the radio-network node 12.

The wireless device 10, the processing unit 601, and/or the receiving module 603 may be configured to receive the DL data transmission from the radio-network node 12, e.g. a number of subframes carrying data information and control parts/information.

The wireless device 10 may comprise a generating module 604. The wireless device 10, the processing unit 601, and/or the generating module 604 may be configured to generate feedback information of the received data transmission for the feedback transmission e.g. add feedback indicators into the feedback message.

The wireless device 10 may comprise a multiplexing module 605. The wireless device 10, the processing unit 601, and/or the multiplexing module 605 may be configured to multiplex the feedback e.g. feedback indicators/information, with UL data over the channel such as the shared channel e.g. the PUSCH. Hence, the wireless device 10, the processing unit 601, and/or the multiplexing module 605 may be configured to perform the uplink data transmission and the feedback transmission by being configured to multiplex the feedback information with uplink data of the uplink data transmission over the same channel.

The wireless device 10, the processing unit 601, and/or the transmitting module 602 is configured to perform the uplink data transmission and the feedback transmission to the radio-network node 12 over the same channel using the one or more resources indicated in the control message. Thus, the wireless device 10, the processing unit 601, and/or the transmitting module 602 may be configured to transmit the UL data to the radio-network node 12 as scheduled and also the feedback, e.g. feedback indicator, of the DL data transmission as scheduled in the control message to the radio-network node 12. The channel may be the physical uplink shared channel and the control message may be an uplink grant.

The methods according to the embodiments described herein for the wireless device 10 are respectively implemented by means of e.g. a computer program 606 or a computer program product, comprising instructions, i.e., software code portions, which, when executed on at least one processor, cause the at least one processor to carry out the actions described herein, as performed by the wireless device 10. The computer program 606 may be stored on a computer-readable storage medium 607, e.g. a disc, a USB, or similar. The computer-readable storage medium 607, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The the wireless device 10 further comprises a memory 608. The memory comprises one or more units to be used to store data on, such as feedback indicators, resources, multiplexing, SRs, reference signals, UL data, applications to perform the methods disclosed herein when being executed, and similar.

Thus, the wireless device 10 for handling the data transmission, UL data, to the radio-network node 12 in the wireless communication network 1 may herein be provided wherein the memory 608 contains instructions executable by said processing unit 601 whereby the wireless device 10 is operative to perform the methods herein.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio-network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio-network nodes will appreciate the cost, performance, and maintenance trade-offs inherent in these design choices.

It is herein disclosed a method performed by a radio-network node for handling a data transmission, such as transmission of data over a subframe, from a wireless device to the radio-network node in a wireless communication network. The radio-network node transmits a control message, such as an UL grant, indicating scheduling of resources for carrying the data transmission over a channel from the wireless device, and which control message further indicates a scheduling of resources, over the same channel, for feedback transmission of a data transmission from the radio-network node.

Furthermore it is herein disclosed a method performed by a wireless device for handling a data transmission to a radio-network node in a wireless communication network. The wireless device receives a control message, from the radio-network node, which control message indicates scheduling of resources for carrying the data transmission over a channel from the wireless device, and which control message further indicates a scheduling of resources for feedback transmission, over the channel, of a data transmission from the radio-network node. The wireless device then transmits the data to the radio-network node as scheduled and also a feedback indicator of a DL data transmission as scheduled to the radio-network node.

Additionally, a radio-network node and a wireless device configured to perform the methods herein are also provided.

It is furthermore provided herein a computer program comprising instructions, which, when executed on at least one processor, cause the at least one processor to carry out any of the methods above, as performed by the radio-network node or the wireless device. It is additionally provided herein a computer-readable storage medium, having stored thereon a computer program comprising instructions which, when executed on at least one processor, cause the at least one processor to carry out the method according to any of the methods above, as performed by the radio-network node or the wireless device.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

What is claimed is:

1. A method performed by a base station in a wireless communication network for handling a data transmission from a user equipment, the method comprising:

scheduling one or more resources for carrying an uplink data transmission from the user equipment over a channel, and one or more resources for carrying a feedback transmission for a downlink data transmission from the base station, over the same channel;

transmitting a single downlink control information (DCI) message to the user equipment, wherein the DCI message indicates the one or more resources scheduled for carrying the uplink data transmission and the one or more resources scheduled for carrying the feedback transmission over the same channel; and reading feedback information received over the channel according to the scheduled feedback transmission, wherein the feedback information is mapped to the one or more resources scheduled for carrying the feedback transmission and uplink data is rate matched around the one or more resources scheduled for carrying the feedback transmission, such that the uplink data is not destroyed by the feedback information, wherein the feedback information is not punctured with the uplink data of the uplink data transmission over the same channel.

2. The method according to claim 1, further comprising: determining based on the feedback information, whether or not to retransmit downlink data of the downlink data transmission.

3. The method according to claim 1, wherein the DCI message comprises an uplink grant and the channel is a physical uplink shared channel.

4. A method performed by a user equipment for handling a data transmission to a base station in a wireless communication network, the method comprising:

receiving, from the base station, a single downlink control information (DCI) message, wherein the DC message indicates one or more resources scheduled for carrying an uplink data transmission over a channel and one or more resources scheduled for carrying a feedback transmission over the same channel, wherein the feedback transmission is for a downlink data transmission from the base station; and performing the uplink data transmission and the feedback transmission to the base station over the same channel using the resources indicated in the DCI message, wherein performing the uplink data transmission and the feedback transmission comprises mapping feedback information to the one or more resources scheduled for carrying the feedback transmission and rate matching uplink data around the one or more resources scheduled for carrying the feedback transmission, such that the uplink data is not destroyed by the feedback information wherein the feedback information is not punctured with the uplink data of the uplink data transmission over the same channel.

5. The method according to claim 4, further comprising:
receiving from the base station, the downlink data transmission; and
generating feedback information for the feedback transmission, based on reception of the downlink data transmission.

6. The method according to claim 4, wherein the channel is a physical uplink shared channel and the DCI message comprises an uplink grant.

7. A base station, comprising:
transceiver circuitry configured for communication with a user equipment; and
processing circuitry operatively associated with the transceiver circuitry and configured to:
schedule one or more resources for carrying an uplink data transmission from the user equipment over a channel, and one or more resources for carrying a feedback transmission for a downlink data transmission from the base station, over the same channel;
transmit a single downlink control information (DC) message to the user equipment, wherein the DC message indicates the one or more resources scheduled for carrying the uplink data transmission and the one or more resources scheduled for carrying the feedback transmission over the same channel; and
read feedback information received over the channel according to the scheduled feedback transmission, wherein the feedback information is mapped to the one or more resources scheduled for carrying the feedback transmission and uplink data is rate matched around the one or more resources scheduled for carrying the feedback transmission, such that the uplink data is not destroyed by the feedback information wherein the feedback information is not punctured with the uplink data of the uplink data transmission over the same channel.

8. The base station according to claim 7, wherein the processing circuitry is configured to determine, based on the feedback information, whether or not to retransmit downlink data of the downlink data transmission.

9. The base station according to claim 7, wherein the DCI message is an uplink grant and the channel is a physical uplink shared channel.

10. A user equipment, comprising:
transceiver circuitry configured for communication with a base station in a wireless communication network; and
processing circuitry operatively associated with the transceiver circuitry and configured to:
receive, from the base station, a single downlink control information (DCI) message, wherein the DCI message indicates one or more resources scheduled for carrying an uplink data transmission over a channel and one or more resources scheduled for carrying a feedback transmission over the same channel, wherein the feedback transmission is for a downlink data transmission from the base station; and
perform the uplink data transmission and the feedback transmission to the base station over the same channel using the resources indicated in the control message by mapping feedback information to the one or more resources scheduled for carrying the feedback transmission and rate matching uplink data around the one or more resources scheduled for carrying the feedback transmission, such that the uplink data is not destroyed by the feedback information wherein the feedback information is not punctured with the uplink data of the uplink data transmission over the same channel.

11. The user equipment according to claim 10, further being configured to:
receive, from the base station, the downlink data transmission; and
generate feedback information for the feedback transmission, based on reception of the downlink data transmission.

12. The user equipment according to claim 10, wherein the channel is a physical uplink shared channel and the DCI message comprises an uplink grant.

* * * * *

UNITED STATES PATENT AND TRADEMARK OFFICE
CERTIFICATE OF CORRECTION

PATENT NO. : 10,517,113 B2
APPLICATION NO. : 16/153188
DATED : December 24, 2019
INVENTOR(S) : Andersson et al.

Page 1 of 2

It is certified that error appears in the above-identified patent and that said Letters Patent is hereby corrected as shown below:

In the Specification

In Column 2, Line 9, delete "eNodas" and insert -- eNodeBs --, therefor.

In Column 2, Line 23, delete "(MING)" and insert -- (MIMO) --, therefor.

In Column 3, Line 1, delete "frog" and insert -- from --, therefor.

In Column 3, Line 9, delete "herein provide" and insert -- herein is to provide --, therefor.

In Column 4, Line 19, delete "in a t manner" and insert -- in an efficient manner --, therefor.

In Column 5, Line 26, delete "nit," and insert -- unit, --, therefor.

In Column 6, Line 58, delete "UL," and insert -- UL --, therefor.

In Column 7, Line 7, delete "indicatory" and insert -- indicators --, therefor.

In Column 7, Line 21, delete "(SINK)," and insert -- (SINR), --, therefor.

In Column 7, Line 25, delete "data a" and insert -- data in a --, therefor.

In Column 7, Line 40, delete "node" and insert -- node 12 then --, therefor.

In Column 7, Line 65, delete "over" and insert -- over the --, therefor.

In Column 8, Line 19, delete "date" and insert -- data --, therefor.

In Column 8, Line 27, delete "transmission" and insert -- transmission over --, therefor.

Signed and Sealed this
Nineteenth Day of May, 2020

Andrei Iancu
*Director of the United States Patent and Trademark Office*

In Column 11, Line 12, delete "The the" and insert -- The --, therefor.

In the Claims

In Column 12, Line 65, in Claim 4, delete "DC" and insert -- DCI --, therefor.

In Column 13, Line 37, in Claim 7, delete "(DC)" and insert -- (DCI) --, therefor.

In Column 13, Line 38, in Claim 7, delete "DC" and insert -- DCI --, therefor.